H. W. SNEDEN.
UNIVERSAL JOINT.
APPLICATION FILED DEC. 5, 1913.
1,129,025.
Patented Feb. 16, 1915.
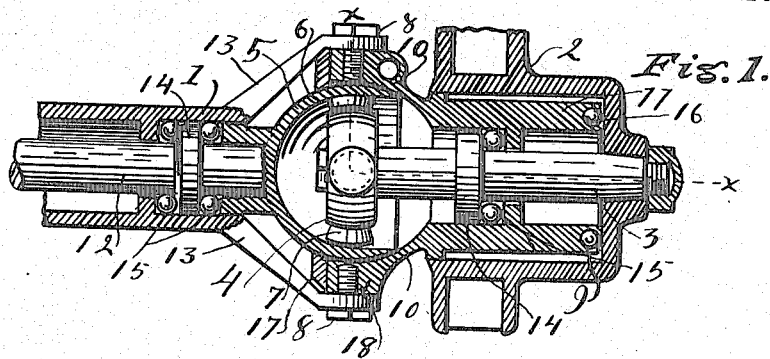
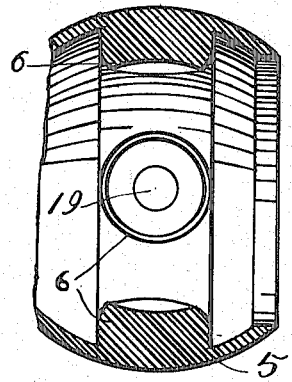
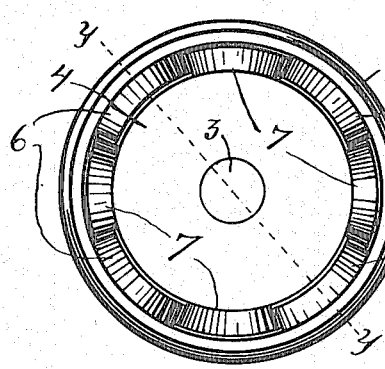
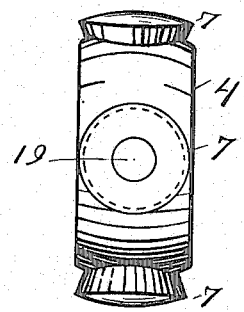
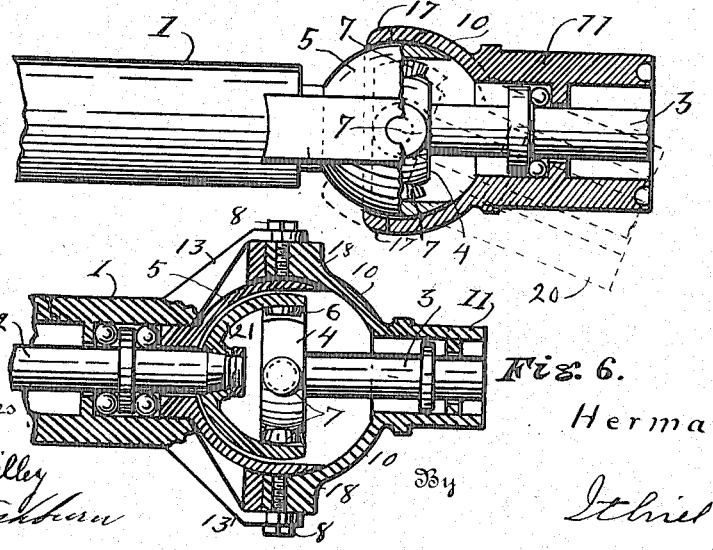
Witnesses
G. E. Cilley
E. C. Washburn
Inventor
Herman W. Sneden
By Ithiel J. Cilley
Attorney

UNITED STATES PATENT OFFICE.

HERMAN W. SNEDEN, OF DUTTON, MICHIGAN.

UNIVERSAL JOINT.

1,129,025.  Specification of Letters Patent.  Patented Feb. 16, 1915.

Application filed December 5, 1913. Serial No. 804,952.

*To all whom it may concern:*

Be it known that I, HERMAN W. SNEDEN, a citizen of the United States, residing at Dutton, in the county of Kent and State of Michigan, have invented certain new and useful Improvements in Universal Joints, of which the following is a specification.

My invention relates to improvements in universal joints, and its objects are: first, to provide a means whereby a shaft may be driven with equal efficiency regardless of the angle it may be made to assume with the driving shaft, within the scope of angle designed; second, to provide a means whereby an oscillating shaft may be made to continue to oscillate while being made to revolve, without varying the efficiency of the driving mechanism, and, third, to provide an oscillating shaft wherewith all dust and grit may be shut out of the working mechanism of the shaft. I attain these objects by the mechanism illustrated in the accompanying drawing, in which—

Figure 1 is a longitudinal section of the inclosing case of my device showing the relative positions of the several parts and the pivotal bolts. Fig. 2 is an end view of the driving, and driven elements in my invention. Fig. 3 is a longitudinal section of the driven shaft case, shown practically on the line X X of Fig. 1. Fig. 4 is a sectional view of the driving element of my device on the line y y of Fig. 2. Fig. 5 is an edge elevation of the driven element of my invention; and Fig. 6 is a longitudinal section of the same showing a modified form of guard and driving mechanism.

Similar figures of reference refer to similar parts throughout the several views.

In the accompanying drawings 1 represents the casing that covers and supports the driving shaft 12.

2 represents an ordinary automobile hub, placed in Fig. 1 for the purpose of illustrating how this movement may be adapted to use for transmitting power and motion to the front wheels of an automobile, as one of the many uses to which it may be applied.

3 represents the driven shaft. If desired collars 14 may be formed on these shafts for the purpose of utilizing balls 15 for facilitating the revolving movement of the shafts and to prevent endwise movement of the shafts.

9 represents a groove in the end of the jacket or casing 11 for the reception of balls 16, designed to overcome friction between the end of the said jacket and the inner surface of the hub 2.

My mechanical movement consists of a larger cup 5 having a series of round, inwardly extending lugs 6 projecting from its inner surface, and a smaller disk 4 having corresponding lugs 7 projecting outward in position, and of a form to exactly mesh with the lugs in the cup 5, as more plainly shown in Fig. 2.

I provide for holding the parts 4 and 5 in proper relative positions by forming arms 13 on the casing 1, and heavy hubs 18 on the cup 10, which cup is made integral with the casing 11, as indicated in Fig. 1, the said arms and bearings being so located that pivotal bolts 8 may be applied upon which the oscillating movement of the driven shaft 3 may be made positive and uniform, said pivotal line being exactly through the diametrical and longitudinal center of the disk 4 so that the pivotal line will always be exactly central with the line of travel of the lugs 6 in the cup 5.

17 represents a collar that may be bolted or otherwise secured to the end of the hub 18 for the purpose of forming a dust proof bearing to extend farther over the surface of the cup 5, which latter is made to fit so closely upon the inner surface of the cup 10 and its extension that while the cup 10 may be made to move perfectly freely over it to provide for the oscillating movement of the shaft 3, it will be impossible for dust or grit to pass through between them and be deposited on the lugs 6 and 7.

It will be noted that the cup 5 or the disk 4 are neither of them in any way connected with the pivotal structure, but are left perfectly free to revolve or to provide the rotary movement of the shafts, and to insure a perfectly free and effective oscillating movement the ends or surfaces of the lugs 6 and 7, and also the surface of the disk and the bearing in the cup 5 must be convex and concave upon the radius of the disk 4 and its lugs 7, as indicated at 7 on Fig. 5; and the efficiency of the movement may be greatly increased by mounting the lugs 6 and 7 to revolve freely on very strong studs, as 19 in Figs. 4 and 5, though they work to perfect satisfaction if made integral with the supporting elements, that is, the cup 5 and the disk 4, but there is, of course much more friction when the lugs are being drawn sidewise over each other, when the shafts are revolving in the relative positions indicated by the solid lines 1, 13 and the dotted lines 20, in Fig. 3, hence much more wear at given points on the lugs than is the case with the lugs made to revolve upon the studs 19. It is necessary that these lugs be made round, or practically round so as to insure perfect contact between them no matter what line in the radius of oscillation the oscillating shaft may assume or be carried to.

In Fig. 1 I have shown my simple form of construction in which the driving lugs 6, 6 are made integral with, or are mounted on the dust guard 5, which in turn is mounted on the shaft 12 and made to revolve freely inside of the case 1, while in Fig. 6 I have shown the more complicated form in which the guard 5 is made fast to the case 1 and an extra element or cup, 21, is secured to the shaft 12 and to which the lugs 6 are made integral or properly attached. By this means I am able to make the dust guard independent of the driving lugs, thus securing a much more safe and desirable construction, though much more expensive of construction, though the operation of the driving and driven elements is the same in both instances, the gist of the invention lying wholly in the peculiar means of transmitting a revoluble motion from a driving shaft to an oscillating shaft.

What I claim as new, and desire to secure by Letters Patent of the United States, is:—

1. In a universal joint, an outer cup shaped case, an inner cup shaped case, said cases pivotally connected to form a globular dust tight chamber, a shaft having one end revolubly connected with one of said cases, a laterally disposed ring mounted on the end of said shaft inside of its case, lugs extending inwardly from the inner surface of said ring, antifriction rollers mounted in said lugs, a shaft revolubly mounted on the other of said cases, a laterally disposed disk mounted on the end of said shaft within its cup shaped case, lugs extending outwardly from the periphery of said disk, antifriction rollers mounted on said lugs in position to exactly mesh with, and travel on the peripheries of the antifriction rollers in the ring.

2. In a universal joint, two shafts normally in alinement, means for pivotally connecting the adjacent ends of said shafts, a laterally disposed ring secured to the end of one of said shafts, a laterally disposed disk secured to the adjacent end of the other of said shafts with the axial centers of said ring and disk in direct alinement with the pivotal connection between the shafts, lugs projecting from the inner periphery of the ring, lugs projecting from the periphery of the disk, and antifriction rollers mounted on said lugs to intermesh to transmit motion from one of said shafts to the other with the shafts at various angles with each other.

Signed at Grand Rapids, Michigan, November 29, 1913.

HERMAN W. SNEDEN.

In presence of—
I. J. CILLEY,
G. E. CILLEY.